(12) United States Patent
Wright

(10) Patent No.: US 7,334,072 B1
(45) Date of Patent: Feb. 19, 2008

(54) SYSTEM, METHOD AND APPARATUS FOR EXTENDING DISTANCES BETWEEN WIRED OR WIRELESS USB DEVICES AND A USB HOST

(75) Inventor: David G. Wright, Escondido, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 290 days.

(21) Appl. No.: 10/839,817

(22) Filed: May 5, 2004

Related U.S. Application Data

(63) Continuation-in-part of application No. 10/260,054, filed on Sep. 27, 2002.

(51) Int. Cl.
*G06F 13/36* (2006.01)

(52) U.S. Cl. .......................... 710/315; 710/16; 710/10; 710/314

(58) Field of Classification Search ........ 710/105–106, 710/312–315, 58–64, 5–19, 36–38, 72; 455/66.1, 455/456
See application file for complete search history.

(56) References Cited

U.S. PATENT DOCUMENTS

| | | | | |
|---|---|---|---|---|
| 5,890,015 | A * | 3/1999 | Garney et al. | 710/62 |
| 6,381,666 | B1 | 4/2002 | Kejser et al. | 710/300 |
| 6,408,351 | B1 | 6/2002 | Hamdi et al. | 710/63 |
| 6,571,305 | B1 * | 5/2003 | Engler | 710/100 |
| 6,584,519 | B1 * | 6/2003 | Russell | 710/62 |
| 6,603,744 | B2 * | 8/2003 | Mizutani et al. | 370/310 |
| 6,633,583 | B1 | 10/2003 | Esterson | 370/466 |
| 6,708,247 | B1 * | 3/2004 | Barret et al. | 710/313 |
| 6,725,302 | B1 * | 4/2004 | Benayoun et al. | 710/62 |
| 6,745,253 | B2 * | 6/2004 | Struble | 710/10 |
| 6,836,862 | B1 * | 12/2004 | Erekson et al. | 714/704 |
| 6,850,512 | B1 * | 2/2005 | Bishop et al. | 370/342 |
| 6,862,643 | B2 | 3/2005 | Wu et al. | 710/302 |
| 6,898,652 | B2 * | 5/2005 | Peters et al. | 710/300 |
| 6,903,727 | B2 * | 6/2005 | Mambakkam et al. | 345/168 |
| 7,024,501 | B1 * | 4/2006 | Wright | 710/72 |
| 7,028,114 | B1 * | 4/2006 | Milan et al. | 710/100 |
| 7,028,133 | B1 * | 4/2006 | Jackson | 710/313 |
| 2002/0010821 | A1 | 1/2002 | Yu et al. | 710/100 |
| 2002/0170064 | A1 * | 11/2002 | Monroe et al. | 725/105 |
| 2003/0041205 | A1 | 2/2003 | Wu et al. | 710/302 |
| 2004/0203415 | A1 * | 10/2004 | Wu | 455/66.1 |
| 2005/0027889 | A1 * | 2/2005 | Sandulescu | 705/250 |
| 2005/0240685 | A1 * | 10/2005 | Keys | 710/8 |

FOREIGN PATENT DOCUMENTS

WO    WO01/11476    2/2001

* cited by examiner

*Primary Examiner*—Raymond N Phan
(74) *Attorney, Agent, or Firm*—Stolowitz Ford Cowger LLP

(57) ABSTRACT

A wireless Universal Serial Bus (USB) device enumerates one or more real or virtual hubs that support transmission of USB data over a wireless network. The number of virtual hubs presented to a USB host can be varied dynamically according to monitored characteristics of the wireless network, such as the propagation delay, Bit Error Rate, or USB configuration of the peripheral device. Another aspect of the wireless system varies a USB transmission rate according to the amount of bandwidth available on the wireless network.

21 Claims, 12 Drawing Sheets

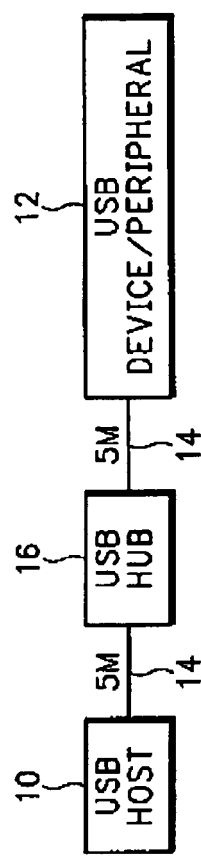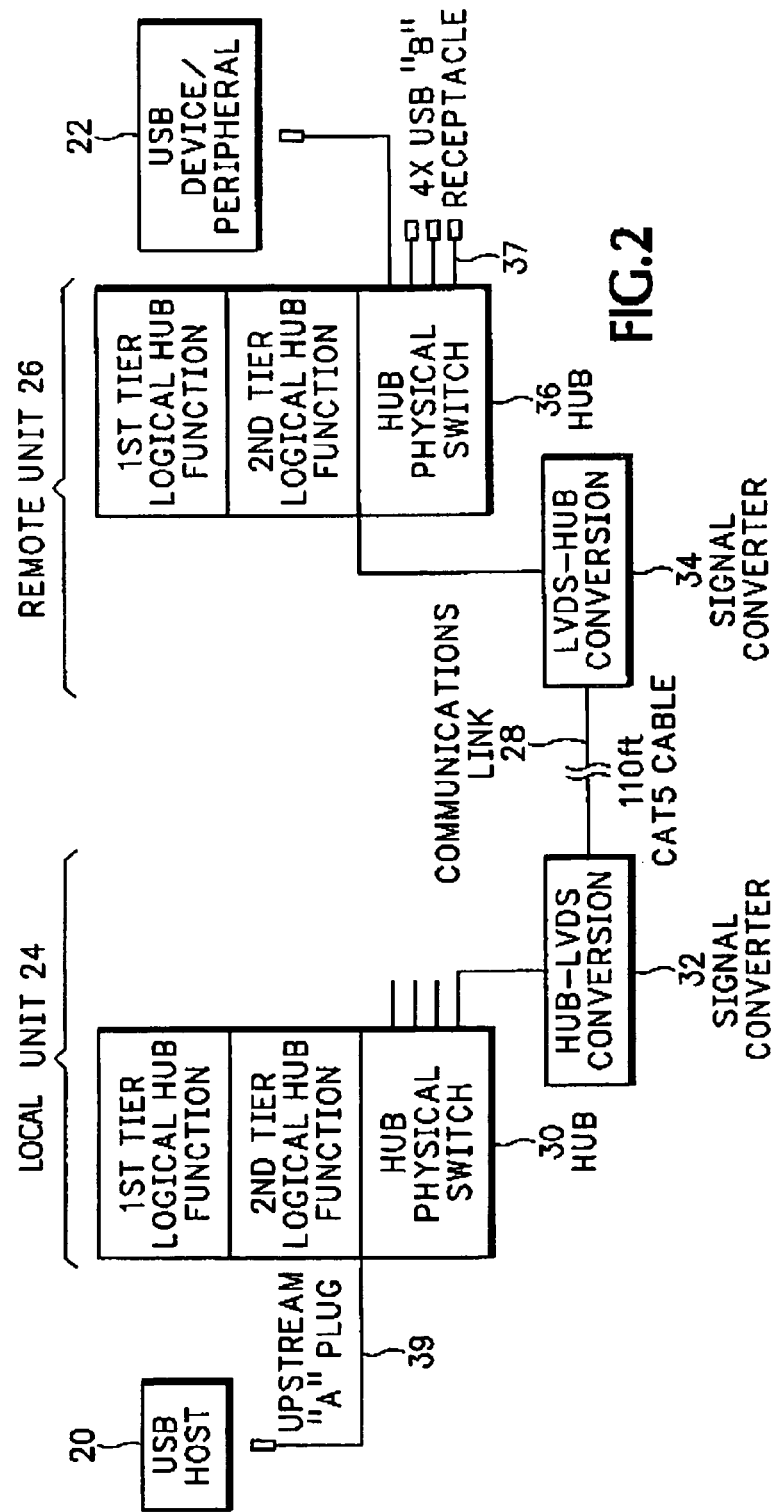

SYSTEM, METHOD AND APPARATUS FOR EXTENDING DISTANCES BETWEEN WIRED OR WIRELESS USB DEVICES AND A USB HOST

This invention is a continuation in part of co-pending application Ser. No. 10/260,054, filed Sep. 27, 2002; entitled: System, Method, and Apparatus for Connecting USB Peripherals at Extended Distances From a Host Computer.

TECHNICAL FIELD

This method and apparatus relates to electronic circuitry and, more particularly, to Universal Serial Bus (USB) communications.

BACKGROUND OF THE INVENTION

The Universal Serial Bus (USB) standard was initially offered in the mid-1990's as an easy-to-use universal interface for a Personal Computer (PC). Since then, USB has gained widespread acceptance. From the user perspective, the benefits of USB include universal plug-and-play and relative ease-of-use. When a USB peripheral is plugged-in to a USB port on a PC, the system will auto-detect and auto-configure the device. In most cases, there is zero user intervention. This is a significant improvement over the prior technology where a user had to open the PC to install a component. The USB interface also eliminates the need for multiple I/O standards, thereby simplifying PC connectivity for the consumer as well as simplifying manufacturing for the PC Original Equipment Manufacturers (OEMs).

The original USB specification has evolved over time to meet the needs of industry, resulting in two versions available today. The USB interface is described as version 1.1 "Universal Serial Bus Revision 1.1 specification" and version 2.0 "Universal Serial Bus Revision 2.0 specification," both documents are available at the USB website http://www.usb.org/developers/docs/.

The first version of the USB, USB 1.1, focused on making computing easy for everyone, and it has been very successful in achieving this goal. However, the bandwidth of USB 1.1 is insufficient for some applications. With a top speed of 12 million bits/second (mbps), the system performance could occasionally become sluggish if multiple multimedia devices were attached to one USB port.

To address this problem the USB specification was updated to version 2.0 to improve the performance and usability of PC peripherals, opening the door to a world of high-performance/high-bandwidth applications such as mass storage, digital video, and broadband access. A further advantage is that all of these applications and many others can run simultaneously. The speed of USB 2.0 has been increased to 480 mbps, a 40× improvement over its predecessor. Both the USB 1.1 and USB 2.0 interfaces are wired interfaces, as they use a cable between the host (for example a personal computer or PC) and the USB peripheral.

The USB devices/peripherals may include devices such as printers, scanners, keyboards, a mouse, joysticks, digital cameras, digital video cameras, data acquisition devices, modems, speakers, telephones or video phones, storage devices such as ZIP drives, or any other peripheral or computing device.

Wireless connection of devices to computers, and wireless networking of groups of computers is one of fastest growing segments of the PC industry. Current and emerging technologies in this field include IEEE 802.11 (also known as 'WiFi'), Bluetooth, and Cypress Semiconductor's proprietary Wireless USB standard. The WiFi specification is at: http://standards.ieee.org/getieee802/802.11.html. The Bluetooth specification is at: https://www.bluetooth.org/foundry/specification/docman/.

While effectively meeting certain application-specific needs, these technologies do not generally offer the combination of versatility, ease of installation and use, and bandwidth of the now dominant wired USB standard. Disadvantages of the 'WiFi' IEEE 802.11 standard for wireless PC peripherals include the fact that it uses significant processing power for every node, which is costly. WiFi also uses a complex network set-up operation at both ends, it is not a simple 'plug and play' operation. In addition, WiFi cannot transparently convert a wired USB peripheral into a wireless peripheral. Disadvantages of the Bluetooth standard for wireless PC peripherals include the fact that it has limited bandwidth which may not be adequate for printing or file transfer, and it cannot transparently convert a wired USB peripheral into a wireless peripheral. Bluetooth also has lengthy and complex setup.

An advantageous wireless technology for connecting peripherals to PCs (and other USB hosts) would retain all the advantages of USB, while allowing wireless connection of devices to hosts. One potential means of achieving this aim would be to simply transmit and receive USB signals wirelessly, instead of over cables, retaining the USB protocol, timing, device model, etc. However, there is an obstacle to such an implementation in the form of the short response times USB devices are required to achieve, which is the reason for the five meter (m) maximum USB cable length.

Although radio frequency (RF) signals propagate somewhat faster through air than electrical signals do through cables, typically radio transmitters and receivers introduce additional propagation delay greater than that typical of line drivers and receivers, such as USB transceivers. Furthermore, many signaling schemes used in wireless systems introduce further group delay. For example, encoding multiple bits in a single transmitted symbol necessarily involves delaying the symbol by one bit period for each bit in the symbol, so the first bit in a 4 bit per symbol above 1 signaling scheme has an intrinsic 3 bit-period delay.

In some cases, the number of bits per symbol may change dynamically in responses to changes in bandwidth, signal-to-noise ratio changes, and changes in the presence of interfering signals. Additionally, usage models for devices connected wirelessly are different from the desktop usage model which USB assumes. For example, wireless devices may be moved during use to a greater extent than is possible with wired devices.

As opposed to USB cables, in the case of wireless connections, there is no predefined physical limit to the distance between the USB host and the USB peripheral device. Further, the physical distance between the USB host and the USB peripheral device may change during use. In the wireless case, multiple peripherals will typically connect individually to a base station over multiple dedicated wireless links (this is analogous to each "wired" peripheral connecting over separate long cables), rather than multiple peripherals connecting by cable to a remote wireless hub which would then communicate with the base station using a single wireless channel.

The present invention addresses this and other problems associated with the prior art.

SUMMARY OF THE INVENTION

A wireless Universal Serial Bus (USB) device enumerates one or more real or virtual hubs that support transmission of USB data over a wireless network. The number of virtual hubs presented to a USB host can be varied dynamically according to monitored characteristics of the wireless network, such as the propagation delay, Bit Error Rate, or USB configuration of the peripheral device. Another aspect of the wireless system varies a USB transmission rate according to the amount of bandwidth available on the wireless network.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 illustrates a block diagram of a USB host coupled with a USB peripheral through a hub.

FIG. 2 illustrates a block diagram of a USB host coupled with a USB peripheral through a set of hubs and signal converters over a communications link, in accordance with one embodiment of the present invention.

DETAILED DESCRIPTION

Figure 3:
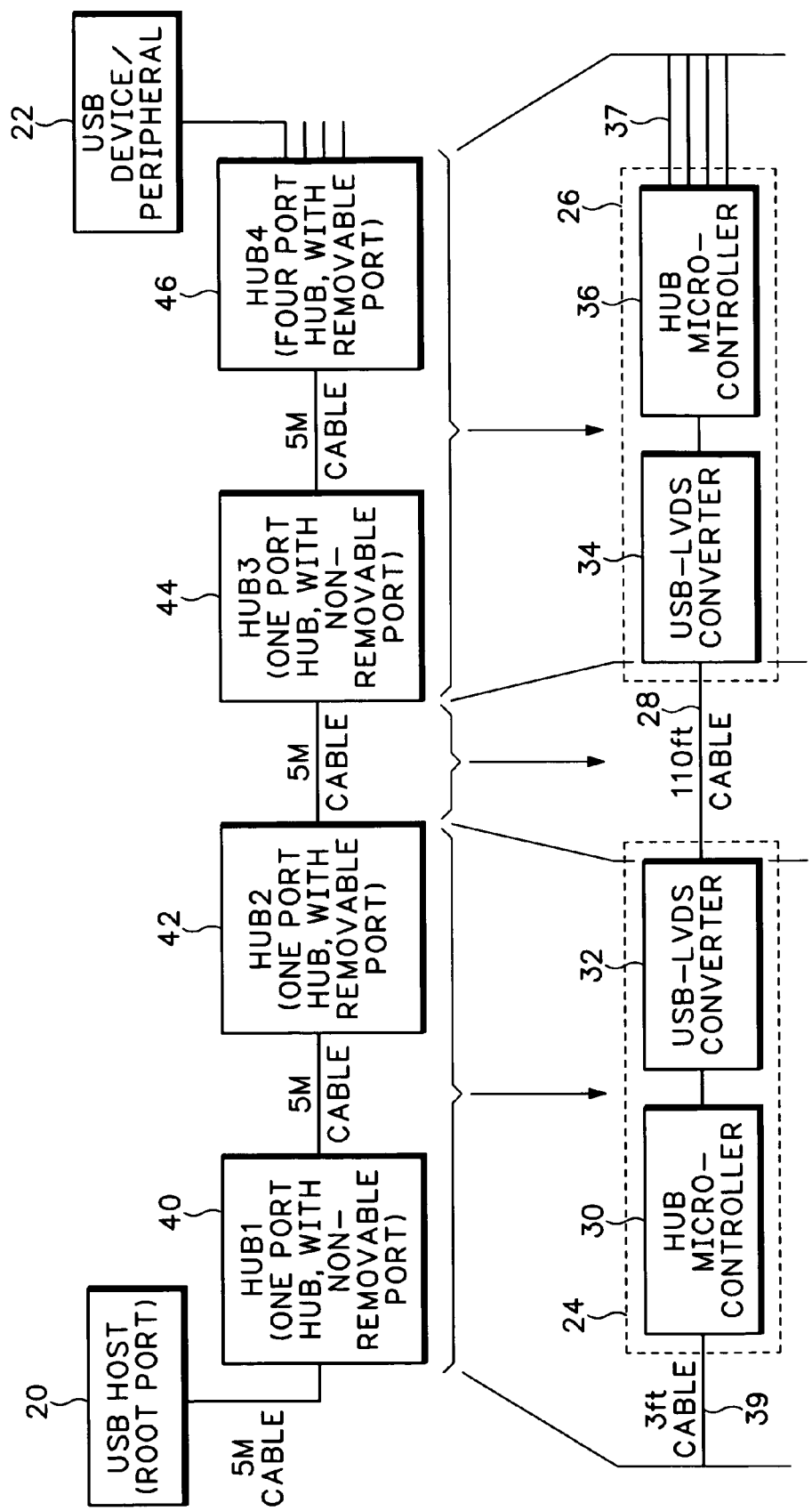
FIG. 3 illustrates a logical representation of the hubs of FIG. 2 as seen by the host, in accordance with one embodiment of the present invention.

Disclosed herein is an apparatus, system, and method for connecting a USB host device, such as a host computer or server, with a USB peripheral over extended distances, such as approximately 100 feet or more. In accordance with one embodiment of the invention, a hub is provided for coupling with the host, the hub configured as a compound device including a hub function and an embedded function, the embedded function being a second hub (i.e., virtual hub).

By configuring the hub in this manner, an additional amount of time for signal transmissions from the hub is made available. A communications link for coupling the first hub with the peripheral device over an extended distance may be provided wherein the characteristics (e.g., length) of the communications link is based in part on the additional amount of time. In this manner, in one example, the length of the communications link may be extended beyond a standard USB cable length to consume the additional amount of time provided by the hub configuration, and the communications link will preferably not introduce any signal transmission propagation delays outside of the USB time budget for the hub configuration. Various embodiments of the invention will now be described.

Wired USB Connectivity

FIG. 2 shows one embodiment of the invention wherein a USB host 20 (also shown as a root port) is coupled with a peripheral device 22 through a local unit 24, a remote unit 26, and a communications link 28 provided in order to extend the connection between the host 20 and the device/peripheral 22. A USB host 20 may include, but is not limited to, a computer, server, or any other device capable of being the master of a USB bus, while a peripheral device 22 may include, but is not limited to, devices such as printers, scanners, keyboards, a mouse, digital cameras, digital video cameras, data acquisition devices, modems, speakers, telephones or video phones, storage devices such as ZIP drives, or other peripherals.

The local unit 24 has a hub 30 and a signal converter 32, and the remote unit 26 has a signal converter 34 and a hub 36. The hub 30 and the signal converter 32 (or the signal converter 34 and hub 36) may be embodied as a single device or apparatus or may be integrated into a single integrated circuit. In one example, the signal converter 32 performs a conversion of a USB signal into a low voltage, differential signal (LVDS) format and signal converter 34 performs a reverse transformation from LVDS to USB. In this format, the communications link 28 may include a cable such as a CAT5 cable of 110 feet connected between the local unit 24 and the remote unit 26.

The communications link 28 may include one or more conductors, wires, optical fibers, transmission medium such as wireless transmission (including infrared or RF wireless), or other means of communicating a signal from the signal converter 32 of the local unit 24 to the signal converter 34 to the remote unit 26. The LVDS transmission medium 28 shown in FIG. 2 is one example of the cabling or transmission medium 28 which can be provided. One benefit of LVDS is that the cable may be terminated at both ends, thereby reducing the amount of electromagnetic reflections which may occur during signal transmissions from the host 20 to the peripheral 22 over the transmission medium 28. Further, LVDS drivers have very low delays from the input to the output of the drivers, and therefore do not add or introduce substantially any signal transmission or propagation delays. LVDS is also an inexpensive transmission medium.

On the opposing end of the communications link 28, in one embodiment the remote unit 26 is provided having a signal converter 34 and a hub 36, to which the peripheral device 22 is coupled. The signal converter 34 is provided for receiving the signals transmitted via the communications link 28 to the remote unit 26 which is coupled with the peripheral 22. In this manner, the signal received by the signal converter 34 is converted and delivered to the peripheral 22. In one embodiment, the signal converter 34 and hub 36 may be embodied in a single apparatus, device, or integrated circuit, if desired.

In one embodiment, the hub 36 of the remote unit 26 is configured to permit connections with one or more peripheral devices 22 thereto, as well as to permit the connection of additional hubs to the hub 36. In this manner, this embodiment of the invention permits additional hubs to be utilized in the system at the end of the remote unit 26 if desired in a particular application.

The host 20 may be coupled with the local unit 24 over a cable 39 of, for example 3 meters, while the peripheral 22 may be coupled with the remote unit 26 using a standard USB A-B cable which may be 5 meters in length, for example. In one embodiment, the remote unit 26 is configured having four USB downstream ports 37, each having a USB "B" receptacle.

In accordance with on embodiment of the present invention, in order that transmissions from the host 20 to the peripheral device 22 are within the timing requirements dictated by the USB specification, the local and remote units 24, 26 are configured such that they realize a time budget savings of propagation delay times. By virtue of the savings of the propagation delay times, a communications link 28 may be provided that permits a connection between host 20 and peripheral device 22 to be extended beyond standard USB cable lengths. For instance, a cable 28 of a length substantially greater than five meters can be connected between the local unit 24 and the remote unit 26.

In one embodiment, the local hub 30 is configured as a USB compound device that combines the functionality of a hub together with an embedded downstream function configured to be a hub (i.e., a virtual hub), so that the local hub 30 is in effect configured as a USB hub with an embedded or virtual USB hub as the embedded function (i.e., the first tier logical USB function is a hub, and the second tier logical function is also a hub). In this manner, the local hub 30 has two USB Device addresses which it will respond to, and hub 30 can act as two devices—the local hub 30 can act as a hub itself using the first device address, and the hub 30 can act as a virtual hub downstream using a second device address.

Per the USB specification, on a per hub basis, 70 nanoseconds of propagation delay are permitted for compliance with the specification for signal transmissions between an "A" plug on the upstream connection of a hub (e.g., for a host) to a "B" receptacle on the hub's downstream port(s) (i.e., for a peripheral). Therefore, because the hub 30 is configured as a hub with an embedded function which is a virtual USB hub, the time budget for such a hub configuration would be 140 nanoseconds (70 nanoseconds plus 70 nanoseconds). However, because the local unit 24 may be physically implemented using a single hub microcontroller chip (FIG. 4) which may be characterized by, for example, a 20 nanosecond propagation delay; and because an approximately three foot long cable 39 (FIGS. 2-3) may be used between the host 20 and the hub 30 having approximately a five nanosecond propagation delay associated therewith; the time budget utilized by the local unit 24 and its associated cable 39 to the host 20 is approximately 25 nanoseconds, in one example.

Since, as recognized by the present inventor, the USB specification would provide 140 nanoseconds for this configuration of hub 30, there are approximately 115 nanoseconds of additional unused time available (140 nanoseconds minus 25 nanoseconds equals 115 nanoseconds) in this example. Accordingly, 115 nanoseconds of additional time corresponds approximately to 60 feet of cabling (using an approximation of six inches per nanosecond of propagation delay over a transmission medium 28 of a cable, in one example)—which means that the use of the local unit 24 having a hub 30 configured as a compound device with an embedded hub function permits the use of a communications link 28 which would consume this additional amount of time for propagating the signal along the communications link, such as a cable of approximately 60 feet in one example. The amount of delay introduced by the signal converter 32 should also be taken into account in the design of the communications link.

If a remote unit 26 and hub 36 are provided with similar characteristics as the local unit 24 and hub 30 (i.e., hub 36 configured as a compound device with an embedded hub function, except that the remote unit 26 may not need a 3 meter cable), then another 115 nanoseconds of additional time is made available which therefore permits the use an additional approximately 60 feet of cabling in one example. Accordingly, because of the additional times made available by the hub configurations of local unit 24 and remote unit 26, a cable 28 of approximately 120 feet can be utilized between the local and remote units 24, 26 while maintaining the time budget expected by USB host 20 and peripheral 22.

FIG. 3 illustrates a representation of the hubs 30, 36 as seen by the host 20 corresponding to the block diagram of FIG. 2, in accordance with one embodiment of the present invention. As shown in FIG. 3, because the local unit 24 is configured as a hub with an embedded function of a hub, the host 20 sees a first hub 40 (i.e., a one port hub with a non-removable port) coupled with a second hub 42 (i.e., a one port hub, with a removable port). Because the local unit 24 is coupled with the remote unit 26 through the signal converters 32, 34 and transmission medium 28 shown in FIG. 2, the host computer 20 sees the second hub 42 coupled with a downstream third hub 44 coupled with a downstream fourth hub 46 coupled with the peripheral 22. Since the remote unit 26 is configured as a USB hub with an embedded function of a USB hub, the host computer 20 sees the remote unit 26 as the third hub 44 (i.e., one port hub with a non-removable port) coupled with the fourth hub 46 (i.e., a four port hub with removable ports). The peripheral device 22 is coupled with a port of the remote unit 26 (which appears to the host 20 as being coupled with the fourth hub 46).

In this example, since the host 20 sees the peripheral 22 coupled through four hubs 40, 42, 44, 46, the time budget permitted under the USB specification for transmitting a signal from the host 20 to the peripheral 22 is greater than the amount of time actually consumed by the local hub 30 and the remote hub 36, and the time remaining in the transmission budget can be actually consumed by extended cabling or signaling of communication link or medium 28.

Figure 4:
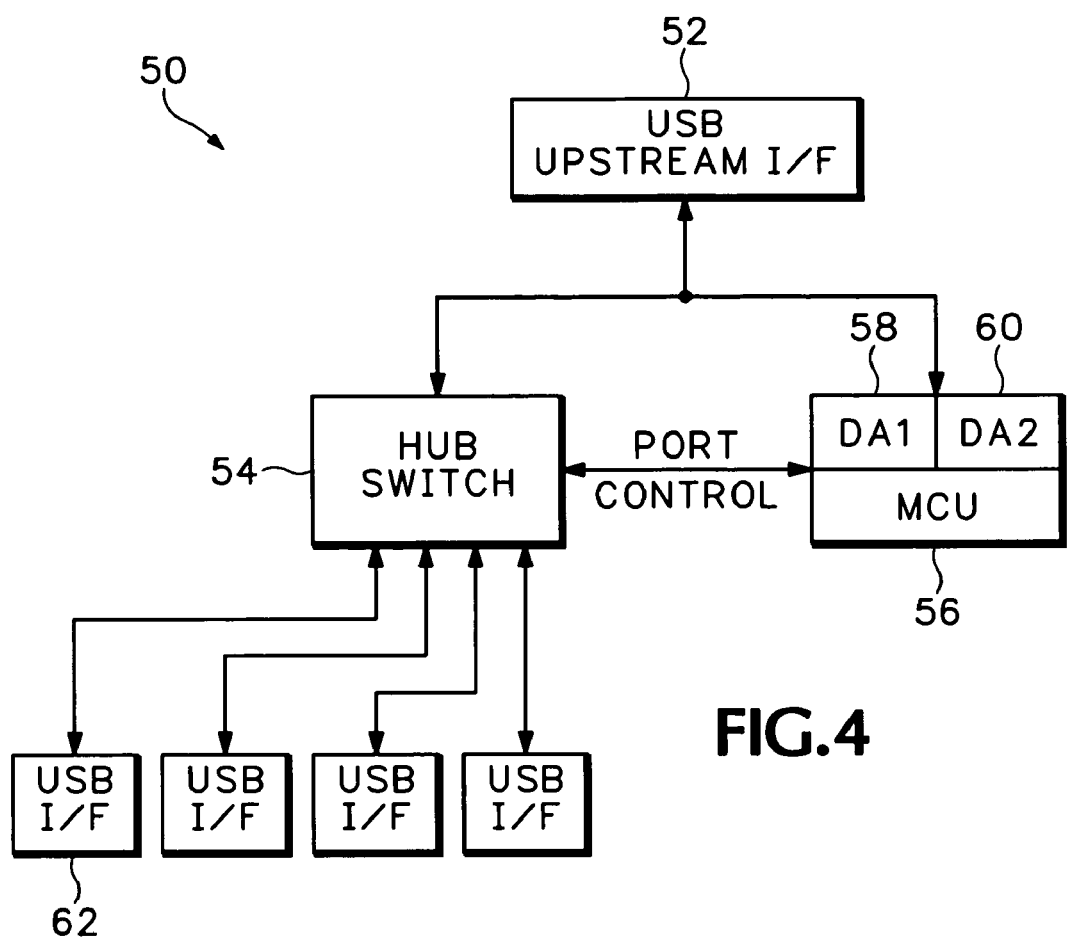
FIG. 4 illustrates a block diagram of an example of a hub which may be used in conjunction with embodiments of the present invention.

FIG. 4 illustrates a block diagram of an example of a USB hub 50 which may be used at either the local or remote hubs 30, 36 shown in FIG. 2. In one example, the hub 50 may be formed using or include an integrated circuit such as a peripheral controller with integrated hub, or a USB hub with microcontroller.

As shown in FIG. 4, the hub 50 may include an upstream interface 52, a hub switch 54, a microcontroller 56 responsive to data addresses 58, 60, and a plurality of a USB downstream ports 62. For example, in the case of the local USB hub 30 receiving data from the host 20, the upstream interface 52 receives the data and makes the data available for processing by the microcontroller 56 of the local hub, which in turn broadcasts data to the active USB downstream ports 62. The hub 50 may support two USB device addresses 58, 60 with one device address 58 for the hub and the other device address 60 for an embedded downstream device configured as a virtual hub. The hub 50 may also include a serial interface engine (not shown) which allows the host 20 to communicate to the hub 50 and functions integrated into the microcontroller 56 of the hub 50. It is understood that while four downstream ports 62 are shown in FIG. 4, the hub 50 may contain a different number of downstream ports depending on the particular application.

Figure 5:
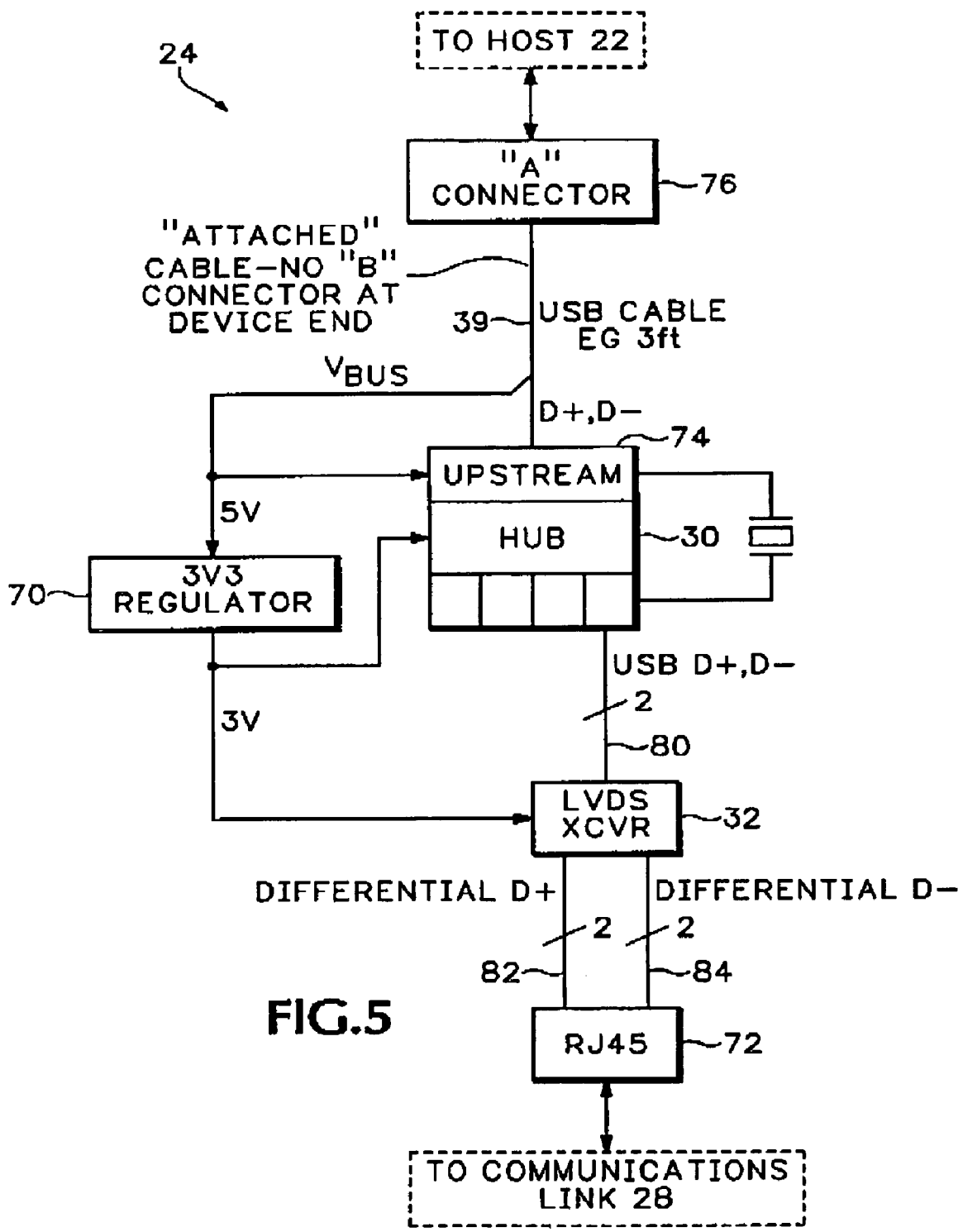
FIG. 5 illustrates an example of a local unit including a hub and a signal converter, in accordance with an embodiment of the present invention.

Referring to FIG. 5, a block diagram of an example of a local unit 24 is illustrated, in accordance with one embodiment of the present invention. The local unit 24 includes a hub 30 and a signal converter 32, and may also include a voltage regulator 70 and a connector 72. The upstream port 74 of the hub 30 may be coupled with an "A" connector 76 and cable 39 for connecting the upstream port 74 to the host 22.

A voltage regulator 70 (i.e., providing 3.3 volts) may be provided which derives a regulated voltage signal from the bus voltage (Vbus) of the cable, in one example. The regulated voltage signal may be coupled with the hub 30 as well as with the signal converter 32, which in this example is an LVDS transceiver. In one example, the LVDS transceiver 32 converts the USB signal lines 80, including the data lines D+ and D–, into differential signal pairs 82, 84 shown in FIG. 5 as Differential D+ as a two wire signal 82, and a Differential D– as a two wire signal 84. These LVDS signals 82, 84 may be made available using an RJ45 connector 72 for connection with the communications link 28.

In operation, when a USB signal from the host 22 is received by hub 30 through the connector 76, the hub 30 processes the USB signal and passes the appropriate data to the appropriate downstream port of the hub 30 to the signal converter 32. At the signal converter 32, the USB signal is converted into a second signal medium, such as LVDS, and transmitted to the communications link 28 over connector 72.

Figure 6:
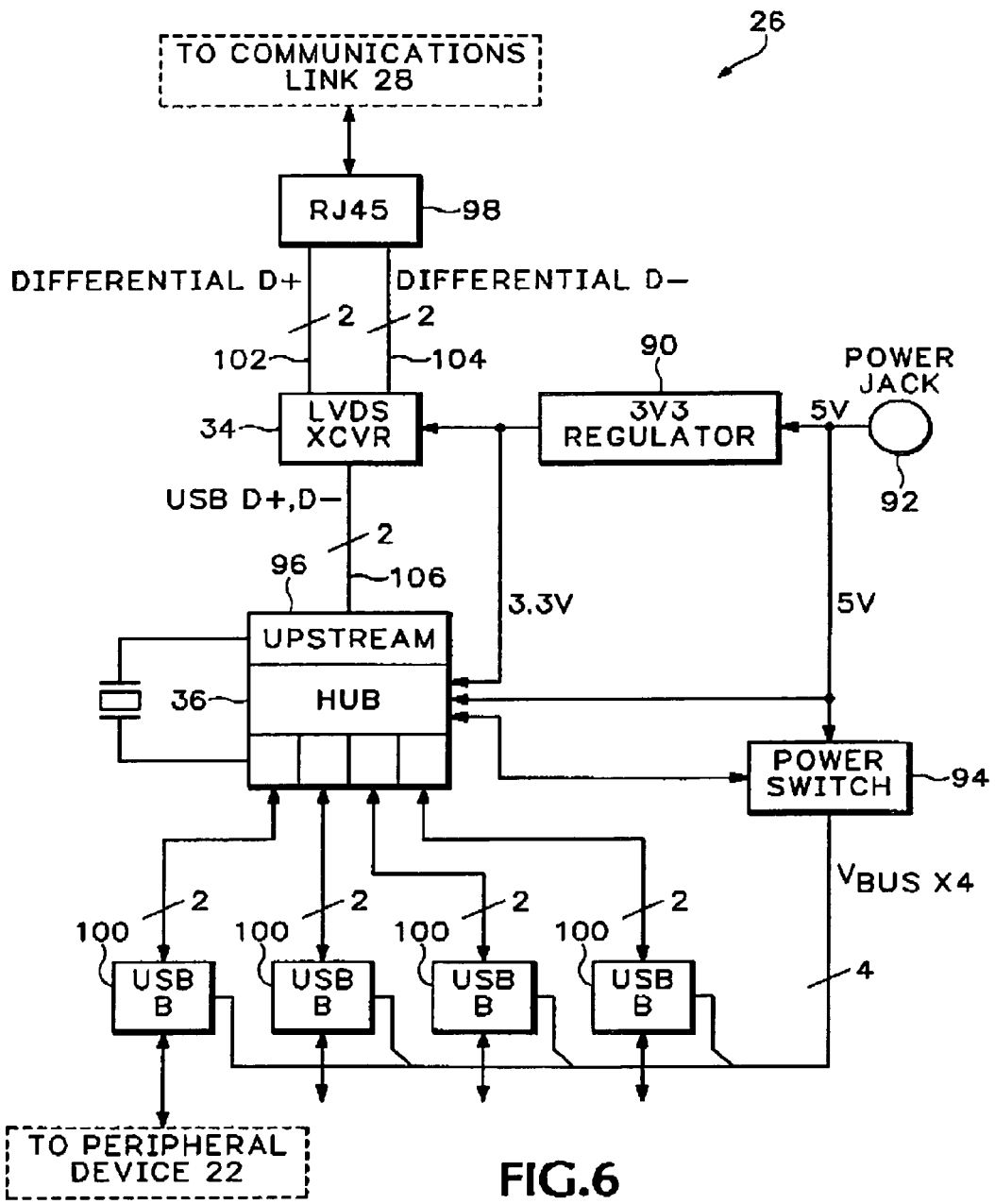
FIG. 6 illustrates an example of a remote unit including a signal converter and a hub, in accordance with an embodiment of the present invention.

Referring to FIG. 6, one example of a remote unit 26 is illustrated, in accordance with one embodiment of the present invention. In this embodiment, the remote unit 26 includes a signal converter 34 and a hub 36, and may also include a voltage regulator 90, a jack 92 for receiving externally supplied power, and a power switch 94. The upstream port 96 of the hub 36 is coupled with the signal converter 34 (in this example, a LVDS transceiver) which is coupled with the communications link 28 through a connector 98, for example, an RJ45 connector.

In one example, the remote unit 26 is provided with a power jack 92 for receiving a power signal provided externally (i.e., 5 volts). The received power signal may be regulated down, for example to 3.3 volts, for providing power to the LVDS transceiver 34 as well as other portions of the hub 36. The power signal may also be coupled through a power switch 94 to one or more of the USB downstream ports 100 of the hub 36, so that the hub 36 may supply and control power to each of the downstream ports 100, for example, 500 milliamps at 5 volts, in order to place the downstream ports 100 in compliance with USB power management requirements.

In operation, when a signal 102, 104 is received through the connector 98 by the LVDS transceiver 34, the signal is converted into a USB signal format and provided as a USB signal 106 to the upstream port 96 of the hub 36. The hub 36 processes the USB signal 106 and passes the appropriate data to the appropriate downstream ports 100 of the hub 36. Each of the downstream ports 100 may be coupled with a device or peripheral 22 using a standard USB "B" cable.

While the various embodiments of FIGS. 2-6 have been described with reference to transmitting a signal from host 20 to peripheral 22, it is understood that a signal could also be transmitted from the peripheral 22 to the host 20.

Figure 7:
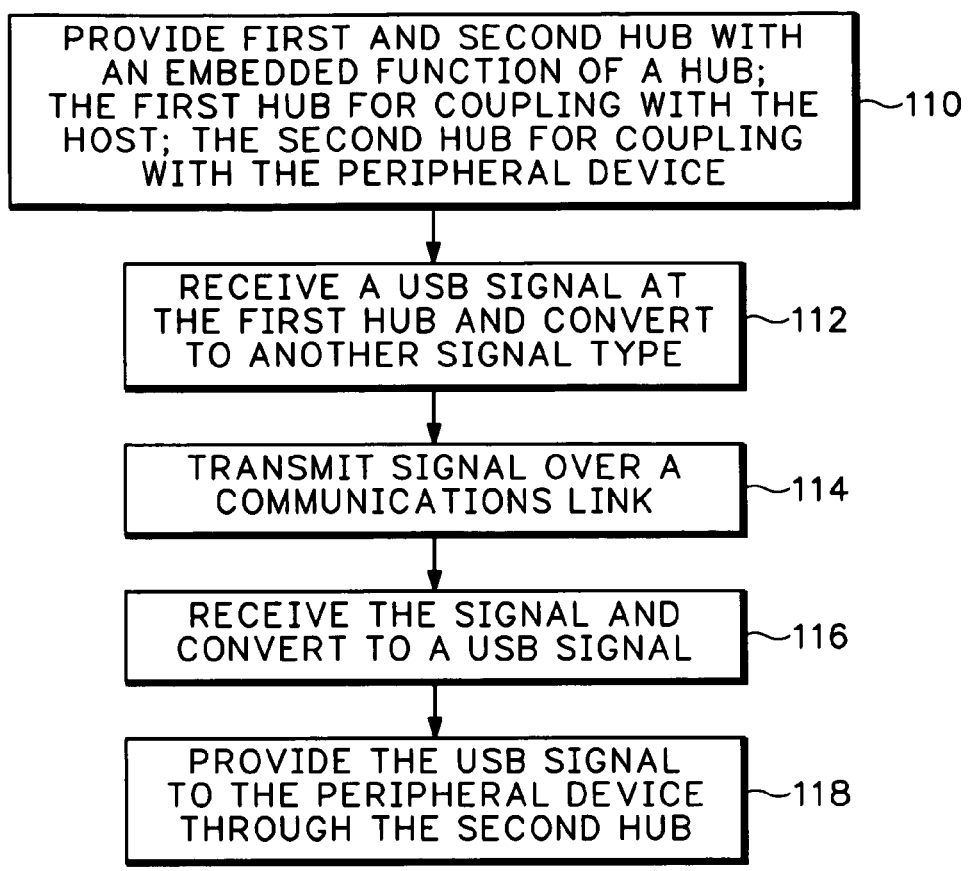
FIG. 7 illustrates an example of logical operations for transmitting a USB signal from a host computer to a peripheral device over an extended distance, in accordance with an embodiment of the present invention.

FIG. 7 illustrates an example of logical operations for transmitting a USB signal from a host computer to a peripheral device over an extended distance, in accordance with one embodiment of the present invention. At operation 110, a first and second hub are provided with an embedded function of a hub. The first hub is adapted for coupling with the host, for example through a USB cable, and the second hub is adopted for a coupling with a peripheral device, for example using a USB cable.

At operation 112, a USB signal from the host computer is received at the first hub, and the USB signal is converted to another signal type suitable for transmission over a communications link. In one embodiment, operation 112 converts a USB signal to a low voltage differential signals (LVDS) type, which provides a level of noise immunity and is suitable for signal transmissions over extended distances. The LVDS signals may be transmitted over a conductor such as a CAT 5 cable. In another embodiment, operation 112 converts a USB signal to a wireless signal, such as a infrared (IR) signal or a radio frequency (RF) wireless signal for transmission over a wireless communications link, or into a signal suitable for transmission over a fiber optic connection or other communications link. The type of communications link/signal type to which the USB signal is converted may depend, in part, on the environment in which the host computer and peripheral device are operating, as well as the types and amounts of noise sources present in such environments.

Having converted the USB signal into a signal type suitable for transmission over a communications link, operation 114 transmits the signal over the communications link. At operation 116, the signal is received and converted to a USB signal. In one embodiment, operation 116 performs a reverse conversion or transformation that is performed by operation 112. For instance, if operation 112 converted the USB signal to an LVDS signal, then operation 116 converts the LVDS signal into a USB signal. If operation 112 converted the USB signal into a wireless signal, then operation 116 would convert the wireless signal into a USB signal.

At operation 118, the USB signal is provided to the peripheral through the second hub, thereby completing the communications of the USB signal from the host computer to the peripheral device. Because operation 110 configured the hubs as having embedded functions of hubs (i.e., virtual hubs), the communications link used at operation 114 can be designed or selected to utilize the additional time made available by such hub configurations.

Accordingly, it can be seen that the operations of FIG. 7 provide for the transmission of a USB signal from a host computer to a peripheral device over an extended distance, while maintaining such transmission within the time specifications permitted by the USB specification. It is understood that while the operations shown in FIG. 7 relate to transmitting a signal from the host computer to the peripheral device, these operations may be used to transmit data from the peripheral device to the host computer—for example, transmitting a signal from the peripheral device through the second hub over the communications link through the first hub to the host computer.

By configuring the local unit 24 as a compound device having a hub function plus an embedded function being a hub function, such a configuration makes available additional time which can be utilized by an extended cable or communications link 28. Similarly, by configuring the remote unit 26 to be a compound device of a hub function together with an embedded function being a hub function, the remote unit similarly makes available additional time which can be utilized by an extended cable or communication link 28. Accordingly, embodiments of the present invention provide for extending a connection 28 between the host 20 and the peripheral 22 while maintaining the timing parameters of signal transmission as specified by the USB specification.

Furthermore, the hub 36 of the remote unit 26 is configured to permit a connection of peripherals or additional hubs to the remote unit 26. In this manner, this embodiment of the invention permits additional hubs to be utilized in the system at the end of the remote unit 26 if desired in a particular application. Alternatively, either the remote unit 26 or the local unit 24 can be configured to have three device addresses, which would increase the time budget available by, for example 70 nanoseconds, which could therefore provide a cable length of approximately 150 feet. In this example, because there would be the consumption of five hubs, such a configuration would not have the capability of attaching a further tier hubs downstream of the remote unit 26.

Various embodiments of the present invention have been described with reference to hubs 30 and 36 in order to provide a communications link of approximately 100 feet in one example. It is understood that a single hub, such as hub 30, may be configured as a USB compound device with an embedded function as a hub thereby providing an additional amount of time for signal transmissions by the hub. A communications link may be provided for coupling the peripheral device to the hub, wherein the characteristics of the communications link are based in part on the additional amount of time made available by the configuration of the hub. In FIG. 7, operation 110 can configure a first hub with an embedded function, and a peripheral may be directly coupled with the first hub over an extended distance, such as 60 feet in one example. In this example, signal conversation operations such as 112 and 116 of FIG. 7 may or may not be used depending upon the particular implementation.

In another embodiment, a single USB hub integrated circuit may be formed having an LVDS or other suitable physical layer connection and up to five device addresses thereby emulating the behavior of a chain of five USB hubs in a single device. In this example, the local unit may comprise a USB-LVDS converter, which, may make available 330 nanoseconds to permit a cable of, for example, approximately 180 feet.

While the communications link 28 has been shown as a conductive cable, in another embodiment the transmission medium 28 may include transmission over a main electricity supply connection (such as a 110 volt or 220-240 volt connection), or telephone connections within buildings. Alternatively, the transmission medium 28 may be implemented using an optical fiber or a wireless (radio frequency (RF) or infrared (IR)) medium. By using a wireless transmission medium, the invention may be utilized to implement connections between USB hosts and USB peripherals over various distances, so long as the propagation delays associated with the transmission medium fall within the time periods made available by virtue of the local and remote unit configurations of embodiments of the present invention, as described above.

Embodiments of the present invention can be utilized where remote control of a PC or other USB host 20 is made through connection of a mouse and/or keyboard 22. Such environments may include industrial control environments wherein the keyboard and mouse 22 and a monitor (separately cabled) can be remotely coupled with a host PC 20 wherein the PC gathers data from data sources proximate to the PC, but the user or administrator wishes to control the operation of the PC from a remote location. Another environment may include professional audio and video processing, wherein a user may wish to remotely control a host PC 20 which gathers audio and/or video data locally. Further, an environment where there are multiple servers—such as a server "farm"—may also benefit from embodiments of the present invention. Using a keyboard/video/mouse (KVM) switch, a user can control, from a distance, multiple host servers. In another example, USB "web cams" (video cameras having transmitters transmitting USB data) can be positioned remotely from the host PC 20 to provide home surveillance and security. In another example, USB peripherals 22 at a point of sale in a retail environment can be coupled using embodiments of the present invention to a host computer controlling or monitoring the USB peripherals, wherein the peripherals 22 may include items such as USB compliant cash registers, USB bar code scanners, USB receipt printers, etc.

Wireless USB Connectivity

The method and apparatus described above can be extended to support wireless USB connectivity. In this alternative embodiment, the virtual hubs are enumerated in a base station which communicates wirelessly with one or more USB peripherals. In one example, the propagation delay is measured between two wireless transceivers. The minimum number of virtual USB hubs is computed for the measured propagation delay to ensure the wireless link complies with the USB specification. The USB device(s) are then enumerated to the USB host as being connected below an appropriate number of USB hubs.

Figure 8:
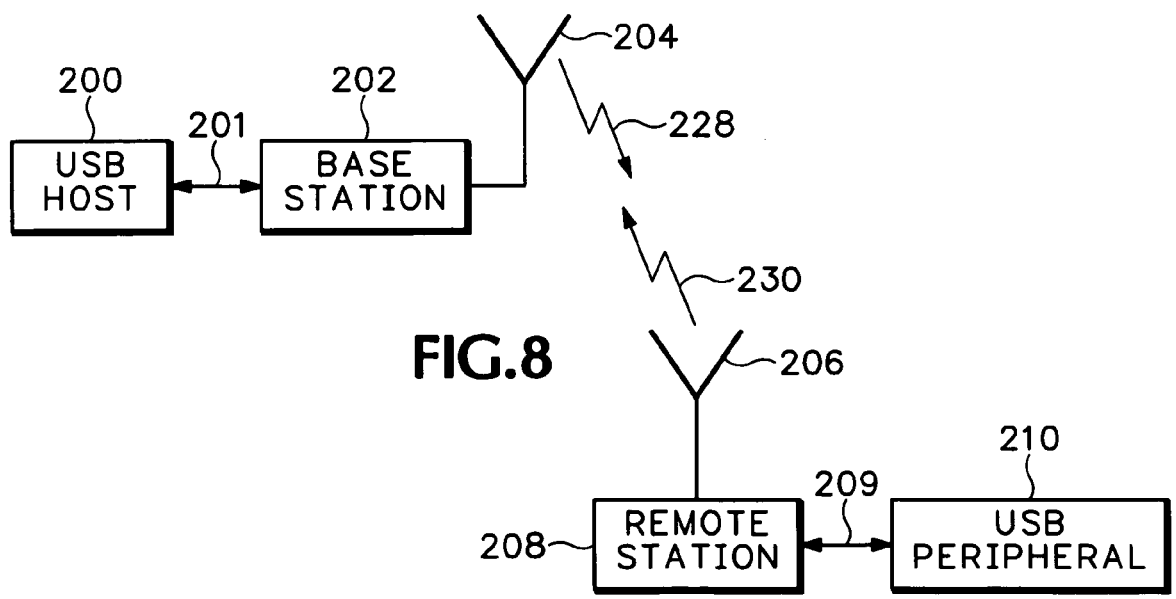
FIG. 8 is a block level diagram of a wireless USB system.

Referring to FIG. 8, a base station 202 connects to a Personal Computer (PC) or other USB host 200 and a remote station 208 connects to a USB peripheral device 210. The base station 202 includes an antenna 204 that transmits wireless radio signals 228 that are received by antenna 206 of the remote station 208. The remote station 208 converts the radio signals 228 into USB data that is processed by the USB peripheral 210. The remote station 208 similarly transmits wireless radio signals 230 from antenna 206 that are received by antenna 204 and converted by the base station 202 into USB data that is processed by the USB host 200.

In some embodiments the functions provided by the base station 202 may be integrated into the USB host 200. In other embodiments, the base station 202 can be a standalone device that is coupled to USB host 200 through an external USB connection 201. In a similar manner, the remote station 208 may be integrated with the USB peripheral 210 or may be a standalone device that is coupled to the USB peripheral 210 through a USB connection 209, such as a USB cable. In other embodiments, the remote station 208 supports either a dual mode wired or wireless communication configuration with the base station 202, or a single mode wireless-only communication configuration. In other embodiments, some of the functions described below for the base station 202 are performed in the remote station 208.

Figure 9A:
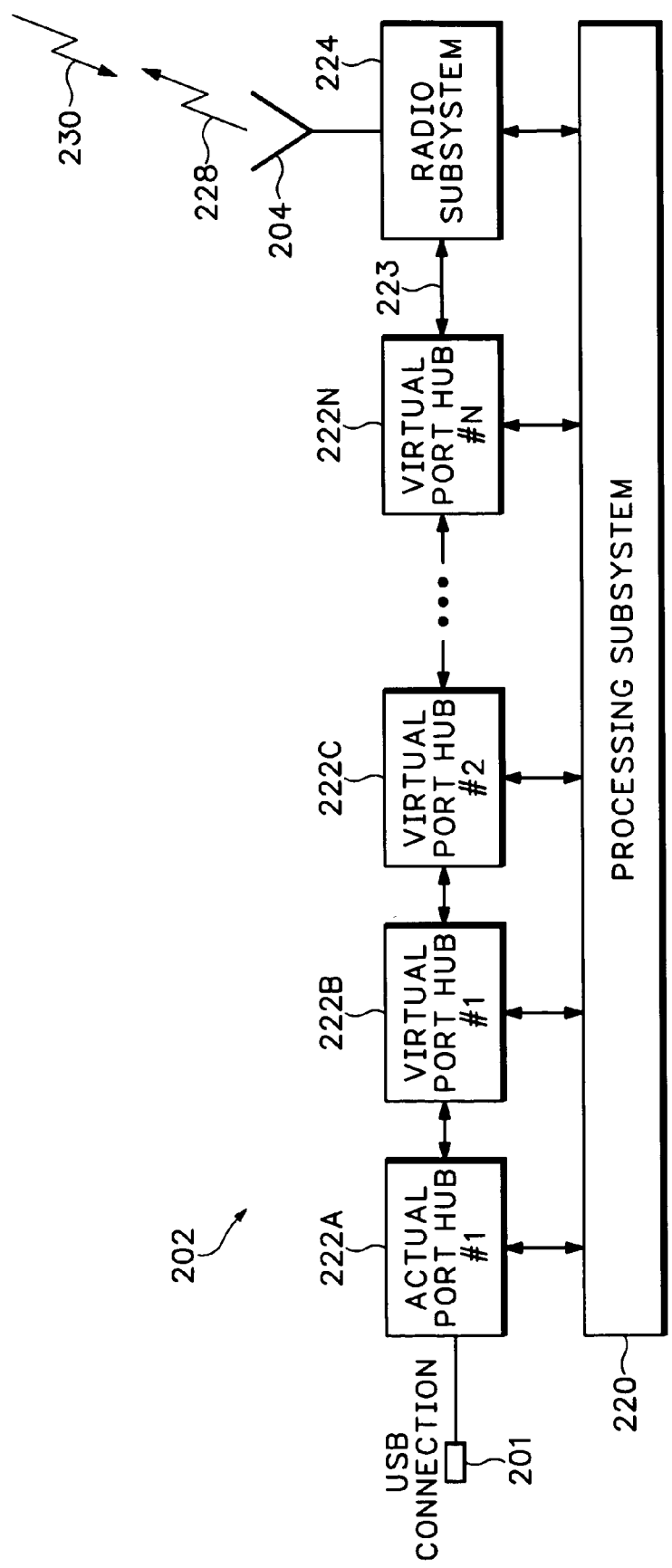
FIG. 9A is a logical diagram of a base station for the wireless USB system.

FIG. 9A shows the logical elements in the base station 202. The base station 202 may include a USB hub function 222A performed by a processing subsystem 220. In one embodiment the processing subsystem 220 is a microcontroller unit (MCU). The processing subsystem 220 is coupled to the USB host 200 (FIG. 8) over USB connection 201 and represents itself to the USB host 200 as being one or more USB hubs 222A-222N.

Figure 10:
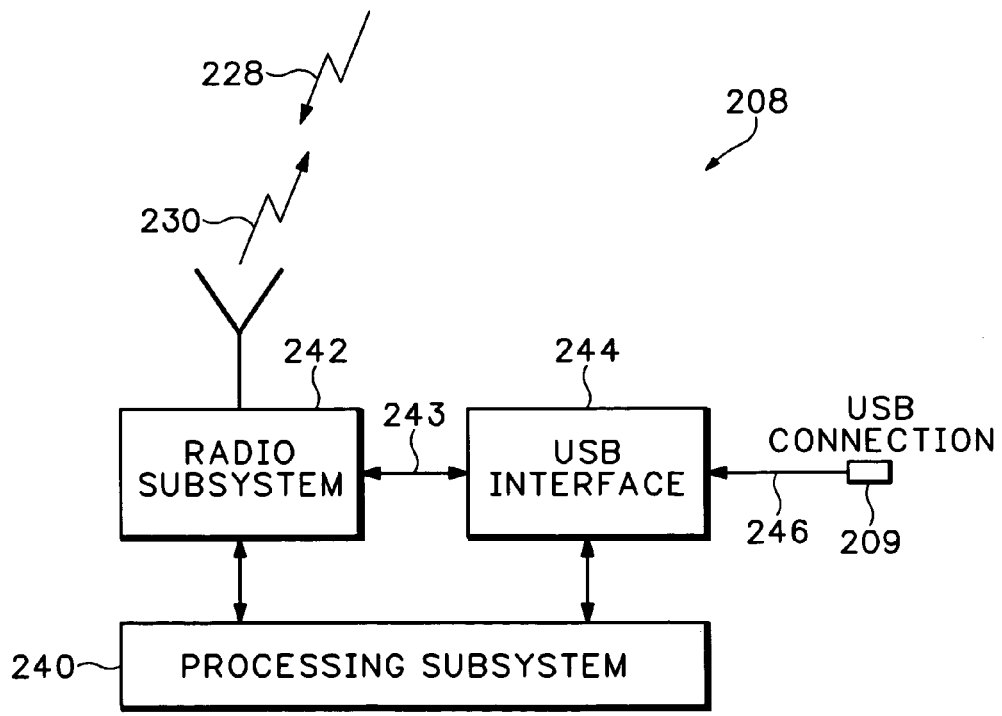
FIG. 10 is a diagram of a remote station for the USB system.

A radio subsystem 224 converts USB electrical signals 223 received from the processing subsystem 220 into radio signals 228 and transmits the radio signals via antenna 204 to the remote station 208 (FIG. 10). The processing subsystem 220 may also control the link layer management for the radio subsystem 224. The base station 202 receives wireless radio signals 230 from the remote station 208 (FIG. 10) and converts the radio signals 230 into USB electrical signals 223 that are sent to the USB host 200 over the USB connection 201.

The processing subsystem 220 in one embodiment calculates a propagation delay for signals 228 and 230 sent and then received back from the remote station 208. The processing subsystem 220 may also calculate an available bandwidth for the wireless link established between the base station 202 and remote station 208.

The subsystem 220 can then configure a hub function to dynamically enumerate the number of "virtual" hubs 222B-222N according to the calculated propagation delay and bandwidth. In another embodiment, the number of virtual hubs 222B-222N may be preconfigured at some predetermined number, such as at a maximum value of four.

Figure 9B:
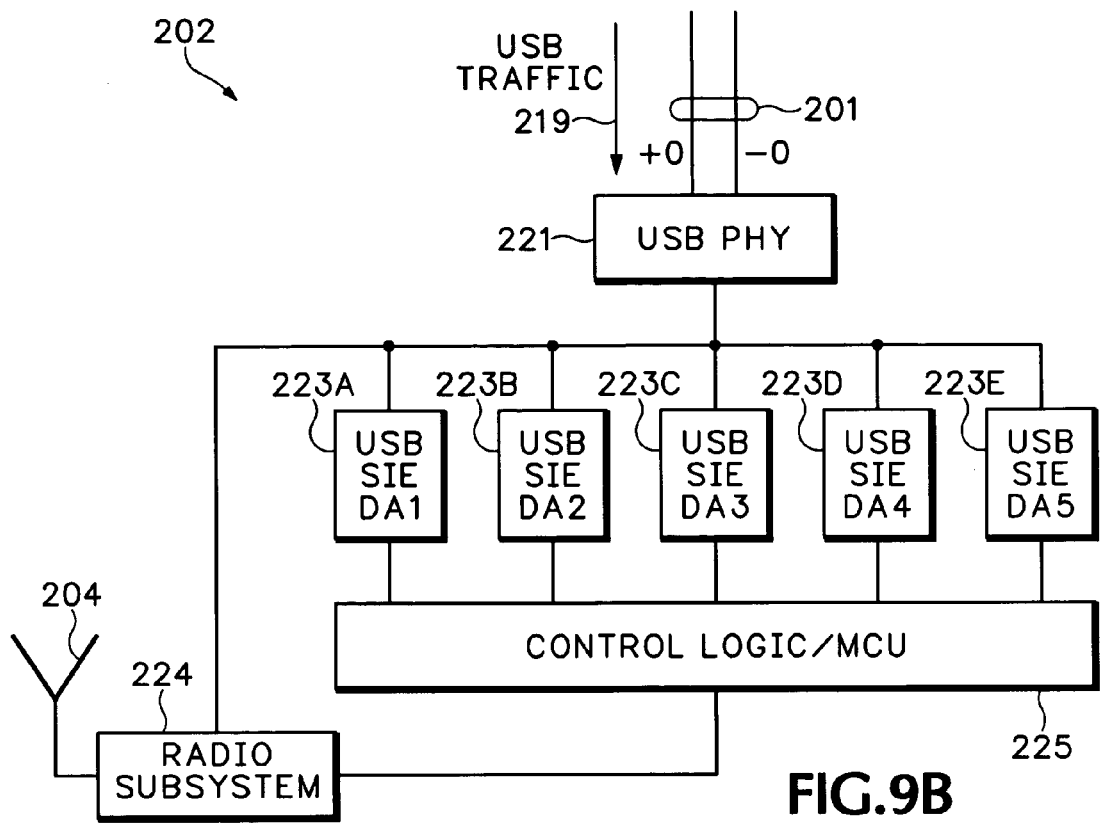
FIG. 9B is a hardware diagram of the base station for the wireless USB system.

FIG. 9B shows one example of a hardware implementation of the base station 202. Multiple Serial Interface Engines (SIE) 223 are coupled between a USB physical layer transceiver (PHY) 221 and control logic 225. The SIEs 223 frame and deframe USB data. In an alternative embodiment, there could be one piece of hardware for SIEs 223A-223E that enumerates multiple device addresses.

The radio subsystem 224 is coupled to the USB PHY 221 and the control logic 225. The control logic 225, in one example, is a Micro-Controller Unit (MCU) that responds to USB device traffic 219 addressed to appropriate SIE Device Addresses (DAs). The control logic 225 operates through a first SIE 233A to perform the function of a hub controller. Each subsequent SIE 223B-223E is used to create additional virtual hubs 222B-222B (FIG. 9A).

When initially plugged into the USB host 200 (FIG. 8), the base station 202 responds to USB Device Address 0 (DA0). If the base station 202 is initially unconfigured, the first SIE 223A responds to USB messages for DA0. The USB host 200 performs a negotiation with the control logic 225 where the control logic 225 enumerates itself and SIE 223A as a USB hub with DA1.

In one example, after the initial enumeration process is complete, the control logic 225 sends control messages through the first SIE 223A to the USB host 200 indicating that another device has been attached to the downstream port of the first USB hub with DA1. Accordingly, the second SIE 223B is assigned a second device address DA2. This process is repeated for each additional virtual hub that needs to be established in the base station 202. If for example, the fifth SIE 223E is configured as a virtual hub, the control logic 225 sends control messages indicating that a USB device has been attached to the downstream port for virtual hub DA5.

USB traffic 219 that is targeted for the USB peripheral 210 (FIG. 8) is therefore associated with DA6 and appears to the USB host 200 as attached to virtual hub DA5. The USB traffic 219 associated with DA6 travels from the USB host 200, through the USB PHY 221 and out through the radio subsystem 224 to the USB peripheral 210.

The actual physical delay from the USB host 200 (FIG. 8) to the signal "on the air" is the delay for cable 201 (30 ns)+the delay of the USB PHY 221 (few ns)+the physical delay for the radio subsystem 224. In the embodiment in FIG. 9B there is no hub switch 54 (FIG. 4) located in the base station 202. Thus, there is no hub switch propagation delay. In an alternative embodiment, the remote station 202 could also provide a hub switch 54 and USB interfaces for multiple hub ports.

FIG. 10 shows in more detail the logical elements in the remote station 208. A radio subsystem 242 converts wireless signals 228 received from the base station 202 into electrical signals 243. A USB interface 244 converts the electrical signals 243 from the radio subsystem 242 into USB electrical signals 246 that are provided over the USB connection 209 to the USB peripheral 210 (FIG. 8). A processing subsystem 240 controls any binding necessary for binding the remote station 208 to the base station 202 and supports any other network management needed by the remote station 208 for conducting the wireless network session.

The radio subsystem 224 for the base station 202 and the radio substation 242 for the remote station 208 include transceivers that can use any wireless transmission protocol for transmitting the USB data. For example, the radio subsystems 224 and 242 such as those used in IEEE 802.11, 802.15, and Bluetooth, or any other type of spread spectrum encoding scheme. The wireless transceivers in the radio subsystems 224 and 242 can alternatively use any other type of wireless technology including infrared, microwave, radio, etc. that are capable of wirelessly transmitting data at USB bit rates.

In one example, the USB LVDS converters 32 and 34 shown in FIGS. 2, 3, 5 and 6 are replaced with the radio subsystems 224 and 242, respectively shown in FIGS. 9 and 10 for converting the wired USB connectively to wireless connectivity.

Figure 11:
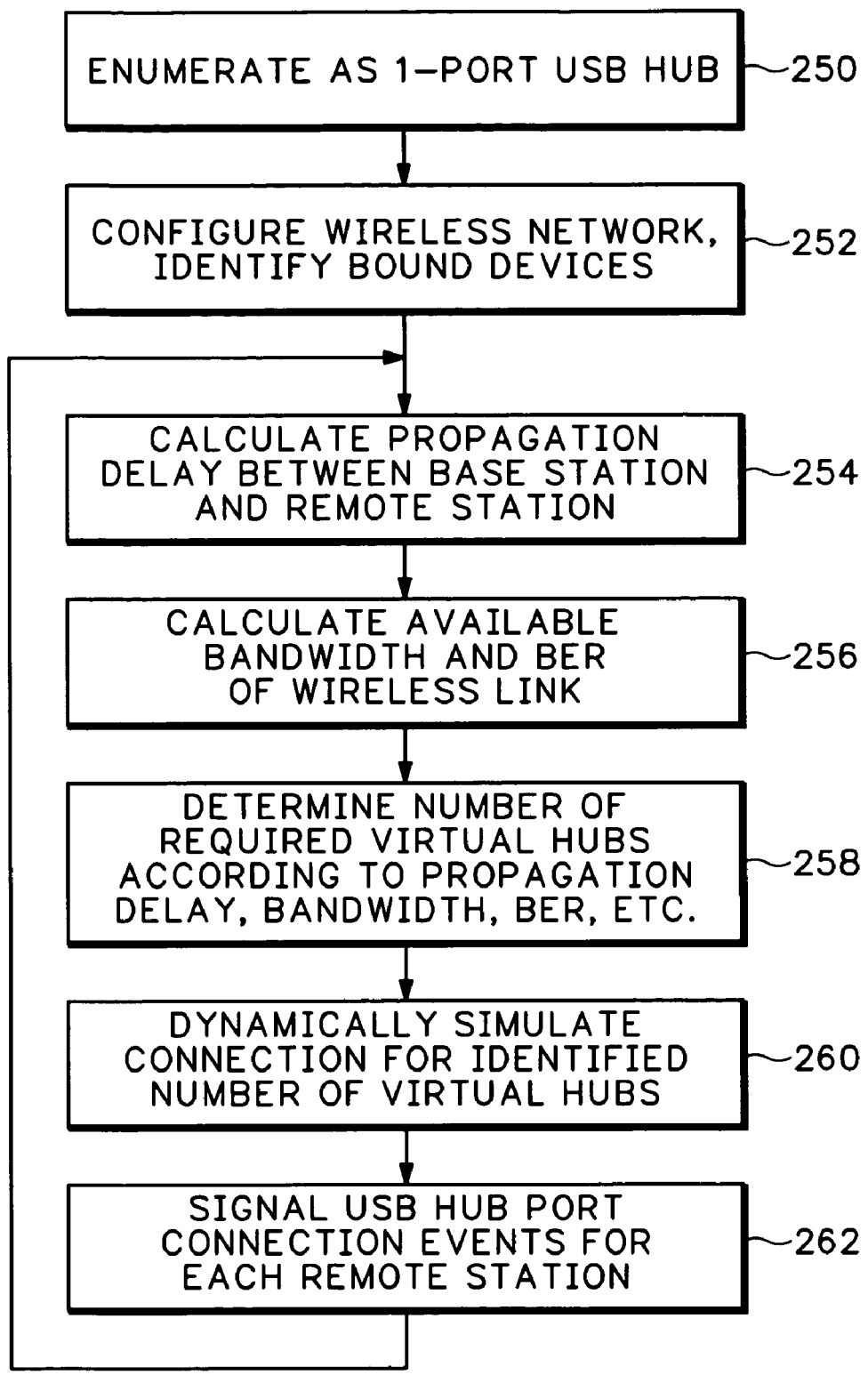
FIG. 11 is a flow diagram showing how the base station configures the wireless USB system.

FIG. 11 is a flow diagram explaining in further detail how the base station 202 establishes the USB wireless connection. In block 250, the base station 205 is connected to the USB host 200 and enumerates as a 1-port USB hub. In block 252, the base station 202 configures the wireless network by communicating with all bound remote stations and offering connection to new remote stations not previously bound. Binding refers to determining which wireless peripheral devices are authorized to communicate with the base station 202. For example, unbound wireless devices, unassociated with USB host 200 may be wirelessly transmitting signals in the same room as the USB peripherals enumerated for the USB host 200, for example, a wireless telephone. The base station 202 does not process data for these unbound wireless devices. Binding will be described in more detail below in FIG. 13. Configuring a wireless network is known to those skilled in the art and is therefore not described in further detail.

In block 254, the processing subsystem 220 calculates the propagation delay between the base station 202 and each bound remote station 208. The subsystem 220 also determines whether the remote station 208 is connected to a USB hub (either a stand-alone hub, or a USB peripheral which is a "compound device"). If the remote station is connected to a USB hub, the propagation delay is adjusted to account for the additional USB hub delay. For example, a USB hub (including both cable and hub switch components of delay) is typically allocated 70 nanoseconds (ns) of delay. Accordingly, an additional 70 ns delay would be added to the propagation delay calculations for a remote station including a USB hub.

There are several different methods that the base station 202 can use for determining the propagation delay. In one embodiment the base station 202 measures the amount of time from when a particular signal is transmitted to the remote station 208 to when a reply signal is received back at the base station 202.

The propagation delay may be determined by the radio subsystem 224 (FIG. 9) sending a particular ping signal that causes the remote station radio subsystem 242 (FIG. 10) to immediately send back a reply signal. The propagation delay between the two radio subsystems 224 and 242 is then added to any other processing delays in the network path between the USB host 200 and the USB peripheral 210.

In another embodiment, the base station 202 monitors USB transactions with the USB peripheral 210. The base station 202 measures the amount of time for the USB peripheral 210 to respond to particular USB messages. The full round trip time from when the USB message is sent to when a response is received back from the USB peripheral 210 is used to calculate the round trip propagation delay. The round trip time can be compared with other response times for similar USB transactions to determine changes in the propagation delay during the USB session. Other techniques for measuring a propagation delay between two wireless devices are known to those skilled in the art and are therefore not described in further detail.

In block 256, the base station 202 determines the amount of bandwidth available on the wireless link for each remote station 208. The calculated propagation delay may affect the amount of available bandwidth since longer delays may limit the number of bits per encoded spread spectrum symbol.

The available bandwidth may also be affected by the bit error rate/signal to noise ratio of the wireless link. Therefore, the base station 202 in block 256 might also calculate the Bit Error Rate (BER) of the wireless link. This can be done by monitoring the number of data bits that are unsuccessfully transmitted between the base station 202 and the remote station 208.

In block 258, the processing subsystem 220 in the base station 202 determines the number of virtual hubs that need to be established according to the measured propagation delay and bandwidth. For example, the maximum total each-way delay of 5 hubs including cables is 380 ns. From this is subtracted the time taken for USB signals to propagate from the USB receptacle 201, through the real hub 222A (FIG. 9) in the base station 202, to the radio subsystem 224, and from the radio subsystem 242 in the remote station 208 to the USB plug/receptacle 209 on the USB peripheral 210. In practice, this may be approximately 20 to 50 ns.

In one example, the delays in the USB path are broken down as follows:

1) USB cable 201 between USB host 200 and base station 202=30 ns;

2) Radio subsystem 224 encoding delay=90 ns;

3) RF propagation delay @ 10 meters (m)=33 ns;

4) Radio subsystem 242 decoding delay=50 ns;

5) USB connection delay in USB connection 209 between remote station 208 and peripheral 210=10 ns.

The combined delay 1+2+3+4+5 identified above must be less than 380 ns. The delays 1+2+4+5 are fixed and known=180. The maximum allowable value for the RF propagation delay (3)=380−180=200 ns. This is equivalent to 60 meters between the base station 202 and the remote station 208. The time to be accounted for by inserting four virtual hubs=2+3+4+5=193 ns. Therefore, the number of required virtual hubs=193 ns/70 ns/virtual hub (round up)=3 required virtual hubs.

In block 260, the processing subsystem 220 dynamically simulates connection of the number of virtual hubs calculated in block 258. Simulation of the virtual hubs is performed in a manner similar to that described above in FIGS. 1-7 for the hardwired USB connectivity. For example, for a 3 hub propagation delay, the processing subsystem 220 enumerates the USB peripheral 210 as being connected to a virtual hub 222C (FIG. 9) that is connected to a virtual hub 222B that is then connected to actual hub 222A.

The number of ports on the last of the virtual hubs 222C is greater or equal to the number of remote stations which are bound in block 252. In block 262, the processing subsystem 220 signals USB hub port connection events for each remote station 208.

Several variations can be provided for the dynamic hub assignment. In one embodiment additional hubs are added when the USB peripheral 210 is determined to be outside of a particular range of the base station 202 for a given number of virtual hubs. If the USB peripheral device moves into a range requiring fewer virtual hubs, the base station 202 may remove one or more virtual hubs.

In another embodiment, the base station 202 maintains the largest number of needed virtual hubs for as long as the USB peripheral 210 remains connected to the USB host 200. For example, the USB peripheral 210 may be moved different distances from the base station 202 during a USB session. The USB peripheral 210 may initially use one virtual hub, then use two virtual hubs as it moves farther from the base station 202. The USB peripheral 210 may then go back to requiring only one virtual hub when it is moved back closer to the base station 202.

To reduce the number of simulated reconnections, the base station 202 may maintain two virtual hubs even after the USB peripheral moves back closer to the base station 202. In another embodiment, the base station 202 may wait a predetermined time period after the USB peripheral device moves back into the closer one virtual hub range before reconfiguring the number of virtual hubs from two back to one.

In one example, the USB host 200 sees the following USB transactions that reduce one of the virtual hubs connected to a USB peripheral device. In this example, the USB peripheral device is a printer connected through two virtual hubs to the USB host 200. To remove one of the virtual hubs from the printer, the processing subsystem 220 sends a USB transaction to the USB host 200 indicating hub 222C is disconnected from hub 222B and the printer is now connected to hub 222B.

Adapting USB Transmission Rates to Wireless Transmission Bandwidth

Figure 12:
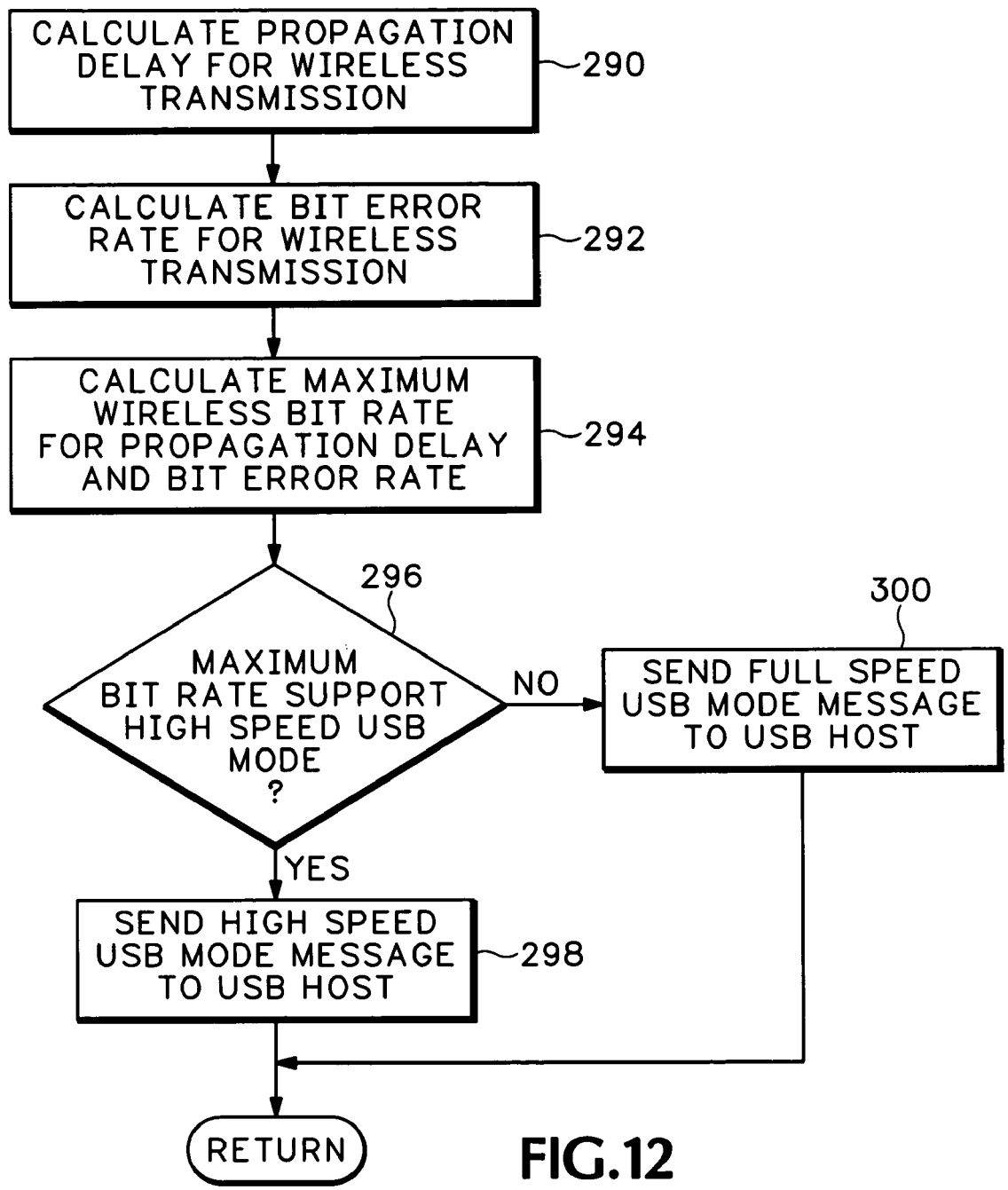
FIG. 12 is a flow diagram showing how the USB bit rate is varied according to a bandwidth value of a wireless link.

FIG. 12 explains in further detail how the wireless USB system controls the USB bit rate according to available wireless link bandwidth. The signal-to-noise ratio of a wireless transmission typically decreases as the wireless device moves farther away from the wireless base station. To compensate for the reduced signal-to-noise ration, the two wireless devices may start transmitting at a lower bit rate. For example, some Direct-Sequence Spread Spectrum (DSSS) systems start using more coding bits to encode each bit of transmitted data. The overall bandwidth or transmission rate of the transmitted data is therefore reduced since more encoding bits are used to encode the same amount of data.

The IEEE 802.11 standard transmits data at 2 million bits per second (bps), IEEE 802.11b transmits data at 11 mbps, IEEE 802.11 g transmits data at 54 mbps, and IEEE 802.11b/g transmits data at either 2 mbps, 11, mbps, or 54 mbps. The ultra wide band wireless transmission standard IEEE 802.15.3a will transmit data at a bit rate of 480 mbps or more.

When the 802.11b/g wireless device is operating relatively close to the wireless base station, data can be transmitted at 54 mbps. However, when the wireless device moves farther from the base station, the bit rate automatically reduces to 11 mbps. The wireless transmission rate drops to 2 mbps when the wireless device moves still farther from the wireless base station. The ultra high band IEEE 802.15.3a standard would substantially increase the upper 54 mbps bandwidth limit of 802.11b/g and may also vary according to the range of the wireless devices.

The USB standard has different configurable transmission rates. For example, a full speed USB mode transmits data at 12 mbps and a high speed USB mode transmits data at 480 mbps. The USB host queries the USB peripheral device to determine if it is configured to operate at the full speed 12 mbps mode or at the high speed 480 mbps mode. The USB host then transfers USB data at the rate identified for the USB peripheral device or USB hub.

Another aspect of the wireless USB system adapts the USB bit rate mode to the available bandwidth of the wireless transmission link. In block 290, the base station 202 measures the propagation delay for the wireless link in a similar manner as block 254 in FIG. 11. In block 292, the base station 202 calculates the Bit Error Rate (BER) of the wireless transmission channel and any other factors that may be needed to determine the available bandwidth for wireless link. Wireless radio transmission protocols such at the IEEE 802.11, Bluetooth, etc. may already calculate the BER.

In block 294, the processing subsystem 220 determines the amount of bandwidth available on the wireless link for each remote station. In block 296, the processing subsystem 220 determines if the maximum available bandwidth for the wireless link can support the high speed 480 mbps USB mode. If the available bandwidth for the wireless link can support the high speed USB bit rate in block 296, the base station 202 sends a message to the USB host 200 in block 298 indicating the high speed USB mode is available for the USB peripheral. For example, the wireless network may use the Ultra wide band IEEE 802.15.3a standard. The USB host 200 then transmits USB data using the high speed 480 mbps USB mode.

If the calculated maximum available wireless bandwidth is below 480 mbps, then the base station 202 sends a USB message to the USB host 200 in block 300 indicating only the full speed USB mode is available. The USB host 200 then configures to operate at the 12 mbps USB full speed mode. The USB bit rate may then change dynamically according to the distance of the USB peripheral from the USB host.

The bandwidth and USB bit rate values described above are only examples and are all variable according to the type of wireless transmission system and USB transmission rates that may be available. It also should be understood that the number of virtual hubs enumerated in FIG. 11 can be varied in combination with varying the USB transmission bit rate as described in FIG. 12.

Figure 13:
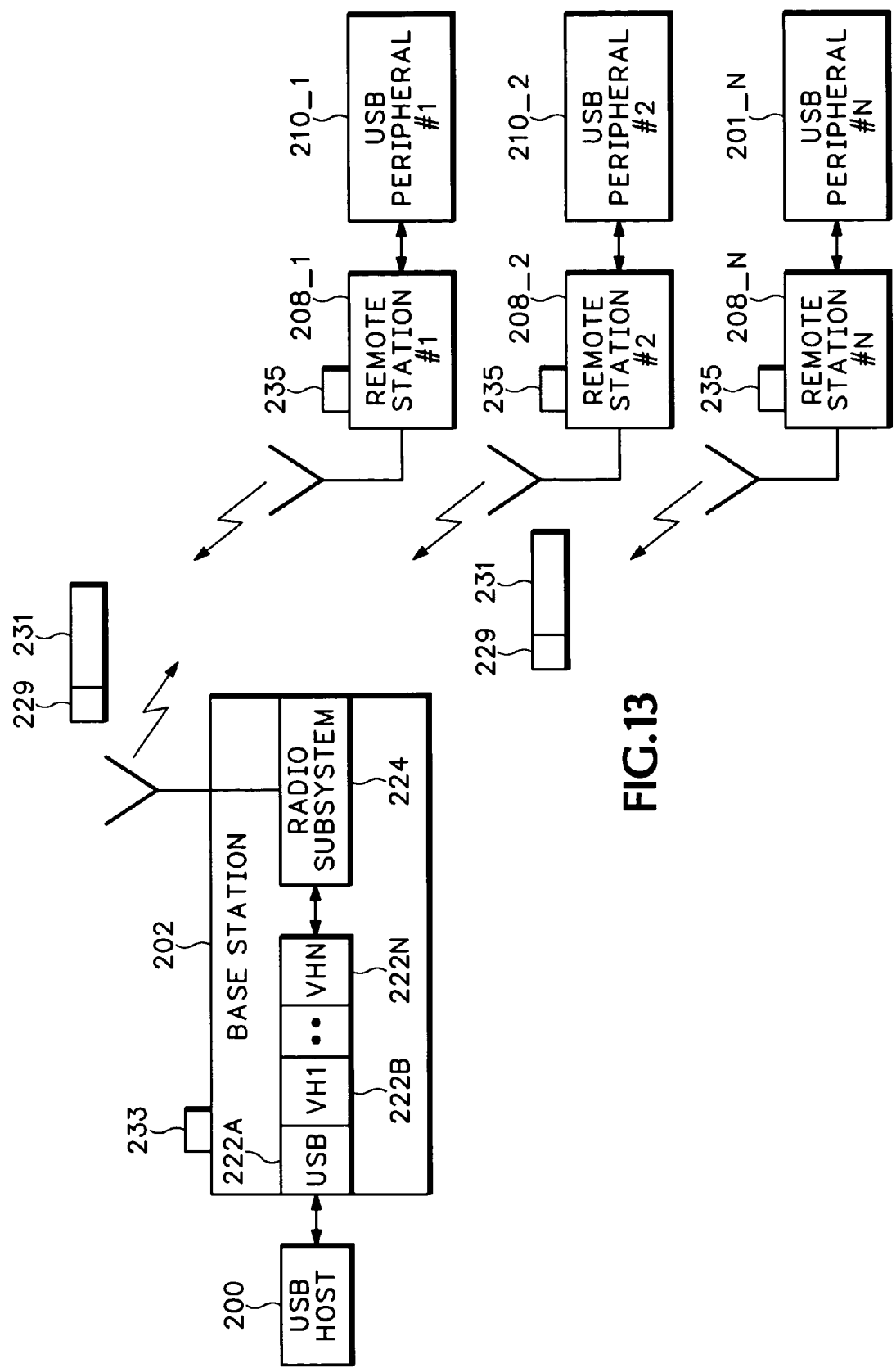
FIG. 13 is a block diagram showing how USB data is transmitted over the wireless USB network.

Referring to FIG. 13, after each connection event, the USB host 200 will begin communicating with the one or more bound remote stations 208 which have just emulated connection to the USB hub port. The downstream data path will flow from the USB host 200, through the hub 222A enumerated in block 250 (FIG. 11) and apparently through the virtual hubs 222B-222N simulated in block 260 (FIG. 11) and then to the radio subsystem 224.

The radio subsystem 224 will communicate the USB data bit-by-bit to the radio subsystem 242 in the appropriate remote station 208. The remote station 208 converts the data into electrical signals which are then converted into USB physical layer electrical signals by the USB interface 244 (FIG. 10), and on to the USB peripheral 210.

The upstream data path from the USB peripheral 210 to the USB host 200 will be the reverse of the downstream path. The USB data will flow from the USB peripheral 210 to the attached bound remote station 208. The USB interface 244 (FIG. 10) converts the USB physical layer signals into radio signals that are wirelessly transmitted by the radio subsystem 242 to the base station 202. The USB data will flow between all bound remote stations 208_1-208_N to the USB host 200 as if the connections were wired, until a new remote station attempts to bind to the network, or an existing remote station 208 drops off the wireless network.

A remote station 208 may drop off the wireless network, for example, to preserve power or because the power to the remote station 208 has been turned off. The processing subsystem 220 in the base station 202 detects a remote station drop off and signals a USB disconnection event on the hub port where the remote station 208 was virtually attached to the USB host 200. Periodically, a network management function in the processing subsystem 220 of the base station 202 may recalculate propagation delay, BER, etc, and if necessary signal disconnection of the virtual hubs, and reconnection with either more or fewer virtual hubs as appropriate.

Binding

As mentioned above, the processing subsystem 220 controls binding of multiple remote stations 208 to the base station 20. Binding determines which wireless devices are associated with each other. The base station 202 should only process the radio signals sent by peripheral devices authorized to communicate with USB host 200.

Remote stations 208 can be bound in any one of multiple ways that are currently used for communicating between wireless devices. For example, buttons 233 and 235 may be simultaneously pressed on the base station 202 and the remote stations 208 at the same time. Simultaneously pressing the buttons 233 and 235 may cause the base station 202 and the one or more remote stations 208 to select a same wireless channel frequency, a same frequency code, or a same frequency hopping sequence.

In another embodiment, the base station 202 and remote stations 208 may send header data 229 along with the USB data 231 that identifies bound wireless devices. In one example, the header data 229 includes a serial number for the base station 202 or a serial number for the remote station 208. Any signals that are received by the base station 202 that include the serial number for an authorized remote station 208 is forwarded to the USB host 200. In a similar manner, the remote stations 208 look for any wireless signals that include the serial number for the base station 202. Any signals received with an authorized base station serial number are converted into USB signals and forwarded to the USB peripheral 210.

In another embodiment, the signals transmitted between the base station 202 and the remote stations 208 are encrypted with a common encryption key that is exchanged between the base station 202 and the authorized one or more remote stations 208. The base station 202 and the one or more remote stations 208 process any radio signals that can be successfully decrypted. Radio signals are ignored that that do not use the same shared encryption key. Other methods for binding wireless devices are known to those skilled in the art and therefore are not described in further detail.

Figure 14:
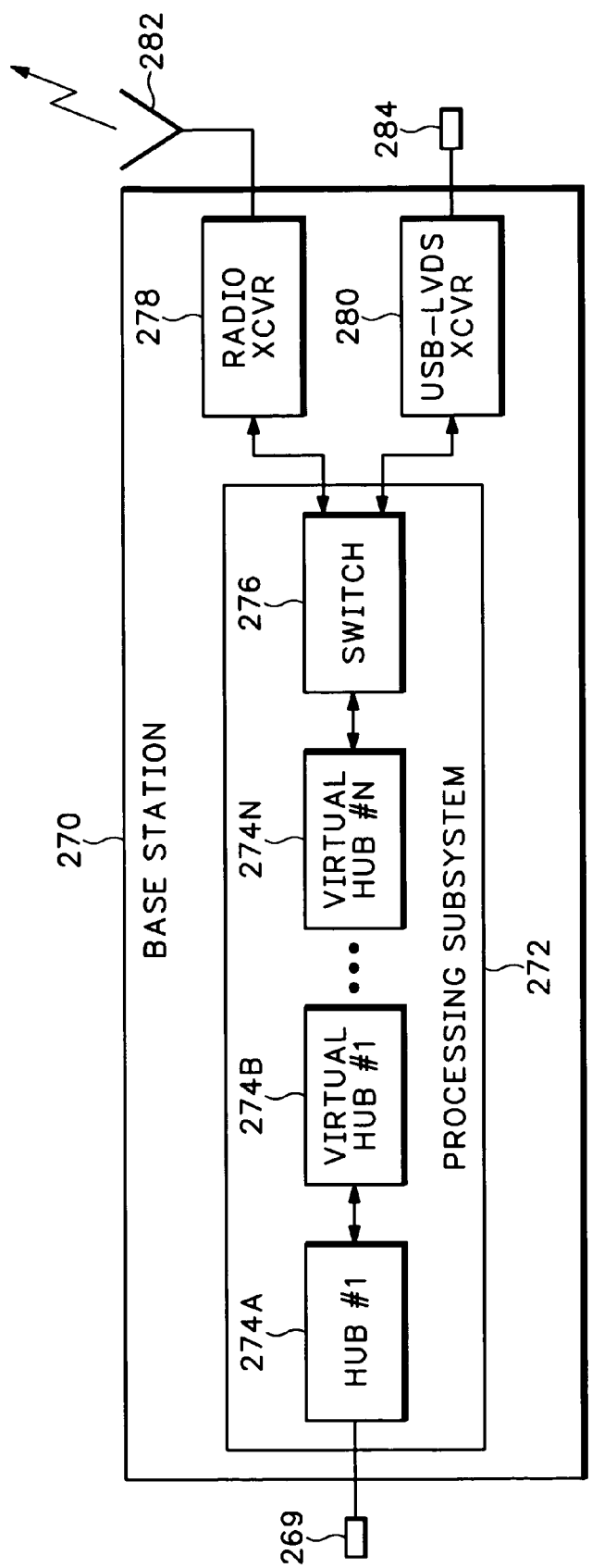
FIG. 14 is a USB base station that provides both wireless and wired USB connectivity.

FIG. 14 shows another embodiment of a base station 270 that provides both wireless and wired USB peripheral connectivity. The base station 270 includes a USB connection 269, an antenna 282 for wireless USB transmission, and a cable connector 284, such as a RJ45 connector, for connecting to an extended length cable. The base station 270 includes a radio transceiver 278 for converting USB data into wireless signals and a USB-LVDS transceiver 280 for converting the USB data into LVDS electrical signals for transmission over the cable 28 shown in FIG. 3.

The processing subsystem 272 configures the number of actual and virtual hubs 274A-274N according to the type of wireless or cable channel. For example, if an extended length cable is connected to connector 284, then the processing subsystem 272 may automatically configure the maximum permitted number of virtual hubs. If the radio transceiver 278 is activated, then the processing subsystem 272 may vary the number of virtual hubs according to the propagation delay, BER, bandwidth, etc. as described above.

The subsystem 272 includes a switch 276 that connects the USB data to either the radio transceiver 278 or the LVDS transceiver 280. In one embodiment, the processing subsystem 272 is a separate microcontroller while the radio transceiver 278 and LVDS transceiver 280 are separate circuits. In another embodiment, the microcontroller used for implementing the processing subsystem 272 may include circuitry to perform some or all of the operations of the transceivers 278 and 280.

One example in FIG. 3 shows only 4 layers of hubs. However, it should be understood that the USB specification provides for 5 layers of hubs. The system described above is readily configurable to 5 layers of hubs or for any number of hub layers that may be available in future versions of the USB specification. In one example, one or more additional Data Addresses 58 and 60 are provided in the device 56 of FIG. 4 to increase the number of hub layers.

This method and apparatus has several advantages including but not limited to the fact that it enables USB peripherals to be wirelessly connected to USB hosts without modification to the USB peripheral. The USB peripheral vendors can add wireless functionality to devices while retaining internal architecture of peripherals simply by adding a small module incorporating the functionality of the remote station 208 described above.

The wireless virtual hub configurations are independent of the radio technology employed and may be applied to any radio system which can achieve a bit-by-bit propagation delay of less than approximately 300 nanoseconds (ns) each way. The implementation cost is a small increment to the cost of the radio technology employed and can support connection of USB devices which are either connected to a hub or which contain a hub (compound devices). The wireless system can adapt to changing range and BER between the base station and the remote station.

More advantages include a USB device which enumerates itself as two or more USB hubs, the number of which may change depending on device configuration; a USB device which enumerates itself as two or more USB hubs, the number of which may change dynamically; the use of propagation delay across a network to vary the number of USB hubs enumerated to a USB host; and the use of bit error rate, signal to noise ratio and/or bandwidth across a network link to vary the number of USB hubs enumerated to a USB host.

In alternative embodiments of the method and architecture, the invention could be simplified, at the expense of some of its features and advantages, by always enumerating the base station as 4 virtual, single port hubs connected upstream of a hub with as many ports as the maximum number the radio network could support. The remote station and peripheral function could be implemented as a single device, with no use of USB signaling. In this case the unified wireless peripheral would still need to implement a USB serial interface engine (SIE), but this could communicate with the radio subsystem using, for example, a parallel interface, rather than a USB physical layer.

The base station could be implemented either as a single integrated circuit (IC) implementing all functions, or by multiple ICs separately implementing one or more of the described sub-functions. The remote station could be implemented either as a single IC implementing all functions, or by multiple ICs separately implementing one or more of the described sub-functions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The invention claimed is:

1. A wireless Universal Serial Bus (USB) device comprising:
a circuit configured to present one or more virtual hubs to a USB host for conducting a wireless USB session with a USB peripheral;
the device associated with a device address and including one or more additional device addresses associated with each of the one or more virtual hubs;
wherein an allowable propagation delay between the USB host and the USB peripheral is determined in part by a number of device addresses configured in the circuit.

2. The device according to claim 1 wherein the USB circuitry varies a USB transmission rate according to an available bandwidth of a radio link used for the wireless USB session.

3. The device according to claim 1 wherein the circuit includes:
- a radio transceiver for wirelessly transmitting and receiving USB signals;
- a USB physical interface for connecting to the USB host;
- multiple USB Serial Interface Engines (SIEs) coupled to the USB physical interface; and
- control logic that configures different real or virtual hubs by establishing different USB Device Addresses (DA) for the SIEs.

4. The device according to claim 1 including a remote station including a wireless transceiver for conducting the wireless USB session, a USB interface for coupling to the USB peripheral to the wireless transceiver, and a processing subsystem for managing the conversion between wireless signals and USB data.

5. The device according to claim 3 wherein a base station includes a cable interface for alternatively conducting the USB session over an extended length cable longer than five meters.

6. A wireless Universal Serial Bus (USB) device comprising:
- a circuit configured to present one or more real hubs and one or more virtual hubs to a USB host for conducting a wireless USB session with a USB peripheral, wherein the circuit automatically configures the one or more real hubs to include a variable number of the one or more virtual hubs, and wherein the one or more virtual hubs are provided as embedded functions in the one or more real hubs, each of the one or more real hubs and the one or more virtual hubs associated with a different device address.

7. The device of claim 6 wherein the circuit varies the number of virtual hubs presented to the USB host according to different characteristics of a wireless link used for conducting the wireless USB session.

8. The device of claim 7 wherein the different characteristics of the wireless link include:
- a propagation delay across the wireless network;
- a Bit Error Rate (BER) of the wireless network; or
- an available bandwidth of the wireless network.

9. The device of claim 7 wherein the USB circuitry varies the number of virtual hubs presented to the USB host according to propagation delay from USB circuitry connected between the USB host and the wireless network and between the USB peripheral and the wireless network.

10. A wireless Universal Serial Bus (USB) system; comprising:
- a remote station including a radio transceiver for establishing a wireless link for transporting USB data and a USB interface for coupling the USB data to a USB peripheral device, characteristics of the wireless link established by the radio transceiver effecting a number of virtual hubs appearing as connected between the USB peripheral device and a USB host, where the virtual hubs are included as embedded functions in one or more actual hubs.

11. The wireless Universal Serial Bus (USB) system according to claim 10 wherein a distance of the remote station from the USB host varies an available bandwidth of the wireless link and a USB bit rate mode is dynamically varied according to the varied available bandwidth.

12. The wireless Universal Serial Bus (USB) system according to claim 10 wherein a number of virtual hubs appearing to be connected to the USB peripheral is automatically varied according to a distance of the remote station from the USB host.

13. A wireless USB system according to claim 10 including a base station including a radio transceiver connecting to an opposite end of the wireless link and a processing subsystem for monitoring the characteristics of the wireless link.

14. A wireless USB system according to claim 13 including a cable transceiver coupled to the processing subsystem for alternatively transferring the USB data over an extended length cable of up to 180 feet in length.

15. A wireless Universal Serial Bus (USB) system; comprising:
- a remote station including a radio transceiver for establishing a wireless link for transporting USB data and a USB interface for coupling the USB data to a USB peripheral device, characteristics of the wireless link established by the radio transceiver effecting a number of actual or virtual hubs appearing as connected between the USB peripheral device and a USB host, wherein a number of virtual hubs appearing connected to the USB peripheral automatically varies according to a Bit Error Rate for the wireless link and enumerating the actual and virtual hubs.

16. A wireless Universal Serial Bus (USB) system; comprising:
- a remote station including a radio transceiver for establishing a wireless link for transporting USB data and a USB interface for coupling the USB data to a USB peripheral device, characteristics of the wireless link established by the radio transceiver effecting a number of actual or virtual hubs appearing as connected between the USB peripheral device and a USB host;
- a base station including a radio transceiver connecting to an opposite end of the wireless link and a processing subsystem for monitoring the characteristics of the wireless link; and
- a cable transceiver coupled to the processing subsystem for alternatively transferring the USB data over an extended length cable longer than a USB cable, wherein the cable transceiver is a low voltage, differential signal (LVDS) transceiver.

17. A method of wirelessly connecting one or more USB devices to a USB host comprising:
- establishing a wireless link for communicating with the USB device;
- emulating one or more virtual USB hubs in a single real hub;
- configuring each of the one or more virtual USB hubs with a different device address; and
- simulating the one or more virtual USB hubs as connected to the USB device to compensate for propagation delay over the wireless link.

18. The method according to claim 17 including:
- periodically monitoring a Bit Error Rate (BER) for the wireless link;
- signaling disconnection of one or more of the virtual hubs to the USB device when the BER decreases; and
- signaling connection of one or more of the virtual hubs to the USB device when the BER increases.

19. The method according to claim 17 including:
- determining an allowable propagation delay for the wireless link according to a number of configured device addresses.

20. A method of wirelessly connecting one or more USB devices to a USB host comprising:
  establishing a wireless link for communicating with the USB device;
  simulating one or more virtual USB hubs as connected to the USB device to compensate for propagation delay over the wireless link;
  calculating an available bandwidth for the wireless link;
  transferring USB data at a slow USB bit rate when the available bandwidth is below a fast USB bit rate; and
  transferring USB data at a fast USB bit rate when the available bandwidth is at or above the fast USB bit rate.

21. A method of wirelessly connecting one or more USB devices to a USB host comprising:
  establishing a wireless link for communicating with the USB device;
  simulating one or more virtual USB hubs as connected to the USB device to compensate for propagation delay over the wireless link;
  periodically monitoring a propagation delay for the wireless link;
  signaling disconnection of one or more of the virtual hubs to the USB device when the monitored propagation delay decreases; and
  signaling connection of one or more of the virtual hubs to the USB device when the monitored propagation delay increases.

* * * * *